Figure 1:
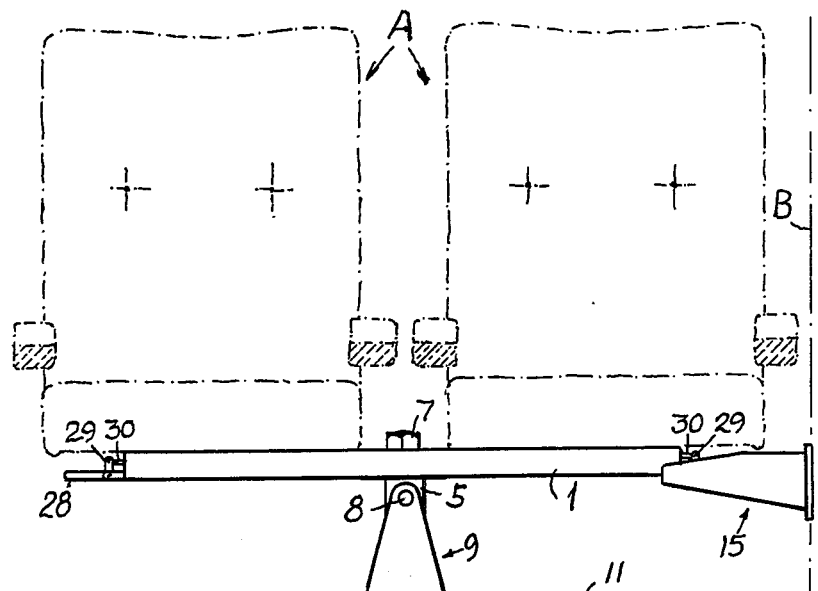

United States Patent [19]
Lie

[11] 4,091,740
[45] May 30, 1978

[54] CHAIR APPARATUS FOR USE IN TRANSPORT MEANS

[76] Inventor: Svein O. Lie, 2391 Moelv, Norway

[21] Appl. No.: 725,136

[22] Filed: Sept. 17, 1976

[30] Foreign Application Priority Data

Sep. 18, 1975 Norway ............................. 753180

[51] Int. Cl.² ............................................. B60N 1/02
[52] U.S. Cl. .................................. 105/345; 296/65 R; 297/349
[58] Field of Search ............... 105/314, 315, 322, 344, 105/345; 296/63, 64, 65 R, 69; 297/349, 240

[56] References Cited

U.S. PATENT DOCUMENTS

| 1,746,986 | 2/1930 | Bell | 297/349 |
|---|---|---|---|
| 1,877,895 | 9/1932 | Kohler | 297/349 |
| 1,937,578 | 12/1933 | Knight | 297/349 |
| 3,394,964 | 7/1968 | Humphries et al. | 297/349 |

FOREIGN PATENT DOCUMENTS

| 1,460,180 | 11/1966 | France | 297/349 |
|---|---|---|---|
| 193,570 | 7/1967 | U.S.S.R. | 105/345 |

*Primary Examiner*—Drayton E. Hoffman
*Assistant Examiner*—Carl Rowold
*Attorney, Agent, or Firm*—Haseltine, Lake & Waters

[57] ABSTRACT

In a sofa or twin chair positioned side by side in transport means, particularly in railway coaches, where the sofa or twin chairs are rotatably mounted about a vertical central axis for rearrangement by change of the driving direction and blocking of the sofa in a desired position. The carriage is tiltable about a transverse axis in order to remove the rotation axis of the sofa from the coach wall; a coupling member at each end when in the adjusted position of the carriage, is in releasably locked engagement with a corresponding coupling member attached to one wall of the coach, and the sofa or pair of chairs are maintained fixed in the adjusted working position.

7 Claims, 6 Drawing Figures

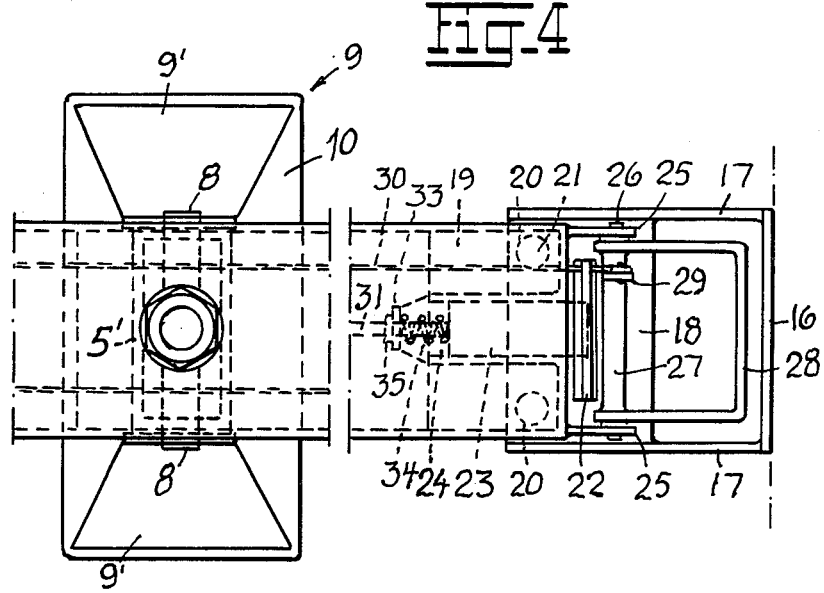
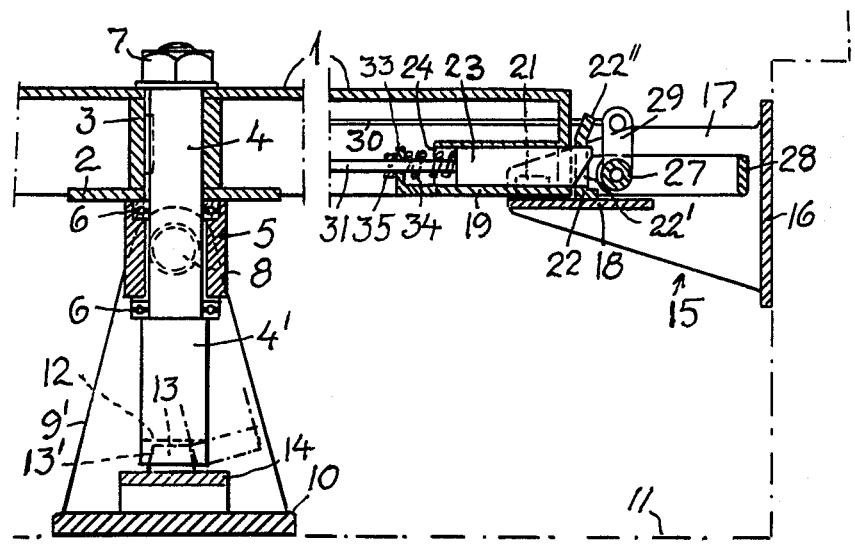

4,091,740

CHAIR APPARATUS FOR USE IN TRANSPORT MEANS

BACKGROUND OF THE INVENTION

This invention relates to an arrangement in a sofa or twin chair positioned side by side in transport means, particularly in railway coaches, where the sofa or twin chairs are rotatably mounted about a vertical central axis for rotation and blocking in a desired direction in relation to the moving direction of the transport means.

With sofas or twin chairs of this kind it has been necessary to position the sofa at a distance from an adjacent wall at least equal to half the length of the diagonal of the sofa plane to allow the corner portion of the sofa to pass the wall by rotational movement. Furthermore the carriage for the rotatable mounting and blocking of the sofa has been designed in such a way that it has occupied the space beneath the sofa, thus making it necessary to adapt the distance between successively positioned sofas correspondingly, while this carriage is complicating an effective cleaning on the floor.

SUMMARY OF THE INVENTION

The purpose of the present invention is to eliminate the above disadvantages, so that the distance of the end of the sofa from an adjacent wall may be reduced substantially, and the passage between successive series of sofas thus will be increased and that the space beneath the sofa is made substantially free, whereby maximum floor space is obtained which not only is easier to clean, but also provides more leg room for the sofa arranged behind.

According to the present invention this problem has been solved with a sofa or twin chairs which in addition to being rotatable about a vertical central axis are arranged pivotably about a horizontal transversal axis positioned underneath and having each end provided with a coupling member which in the correct position of the sofa cooperates with a corresponding coupling member attached to the wall for blocking of the sofa and retaining it in the correct position for use.

The sofa at each end has a foot lever which is connected to the coupling member at the opposite end of the sofa for disengagement of this end when the sofa is pivoted and rotated to the opposite service position. Futhermore there is provided a guiding means arranged between the sofa and the undercarriage to retain the sofa in pivoted position during the rotational movement.

Further features and advantages in the invention will be obvious from the following description with reference to the drawings which are showing a preferred embodiment of the invention and wherein:

IN THE DRAWINGS

Figure 2:
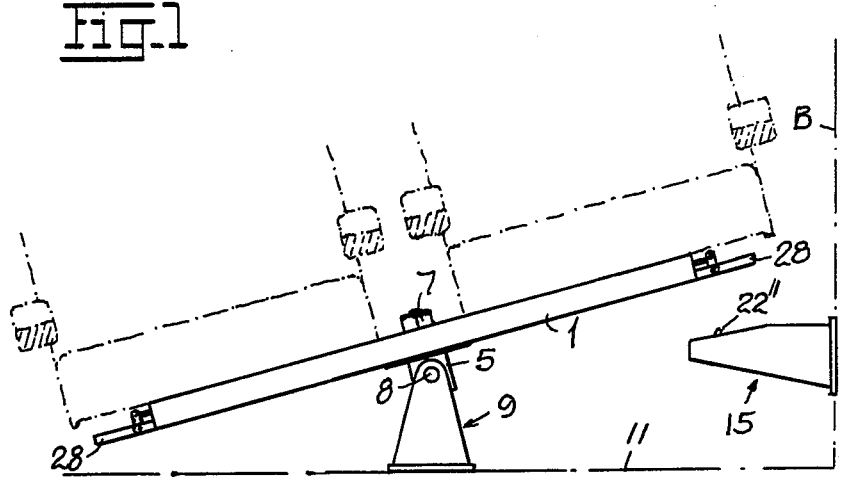
Figure 3:
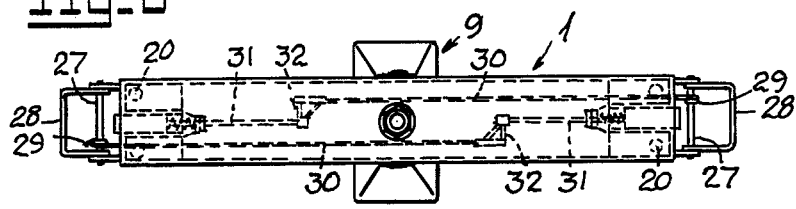

FIG. 1 is a schematic front view of a set of chairs mounted as a sofa and arranged according to the invention, FIG. 2 is a similar view of the sofa pivoted to a rotating position, FIG. 3 is a top plan view of the supporting beam and supporting foot of the sofa, FIG. 4 is a top plan view on a larger scale of one end portion of the supporting beam with the supporting foot, FIG. 5 is a side elevational view in a vertical section of FIG. 4, and FIG. 6 is a detailed view of the lower end portion of the king pin or fulcrum.

PREFERRED EMBODIMENT OF THE INVENTION

In the drawings A designates two chairs side by side or a sofa of the type which is used for instance, in railway coaches and which are positioned adjacent one side wall of the coach and designated B.

The chairs or sofa in the following description for the sake of simplicity called a sofa, is according to the invention mounted on one longitudinally extending supporting beam 1 with substantially U-formed cross section and with the channel side or opening facing downwardly. A plate-formed member 2 is attached by including for example, at the central axis of the beam 1 between the lower edges of its side walls: and a hub 3 is formed between this plate and the web of the beam having a bore for receiving in a nonrotatable fashion, the upper portion 4 of a pivot or king pin which is extends through a bearing sleeve 5 beneath the plate member 2 and rotatably abutts against same, said sleeve is maintained through axial ball bearings 6 between a shoulder on the expanded lower portion 4' of the shaft member 4 and the plate member 2 on the underside of the beam 1 by means of a nut 7 screwed onto the upper end of the shaft member 4 on the upper side of the beam.

The bearing sleeve 5 is provided with attached diametrically extending pivots 8, the axis of which is coincident with the vertical central plane of beam 1. The sleeve 5 has been formed with a right angled frame portion 5' (see FIG. 4) through the end portion of which the pivots 8 have been extended to stiffen the pivots 8 and for simultaneously increasing the contact surface of the sleeve 5 against the plate 2 in the transverse direction of the beam.

Pivots 8 have their outer ends rotatably journaled in the upper ends of the side elements 9' of a supporting foot or bearing bracket 9 which has a base plate 10 secured to the floor 11 of the carriage. By this arrangement, the king pin 4 together with the beam 1 are pivotable about pivot 8 for the tilting the beam in the longitudinal direction and rotation in this position about the king pin 4.

The lower end of the king pin portion 4' has a channel formed groove 12 parallel with the longitudinal direction of the beam 1 and designed to receive a correspondingly flat trunnion 13 secured to a supporting member 14 arranged on the base plate of the bearing bracket. The trunnion 13 has upwardly inclined sides 13' being adapted to the diameter of the king pin portion 4' in such a way that in the tilting position of the beam 1, the circumference of the king pin portion 4' will contact the adjacent side surface 13' of the trunnion 13 as indicated with broken lines in FIG. 5 and thus block it against return pivot movement to vertical position before the groove 12 is again aligned with the trunnion 13. This will only occur when the beam 1 is parallel with the service position of the sofa. In this way tilting movement of the sofa is avoided and the sofa must be counter - acted manually during rotational movement.

For releasable attachment of the supporting beam 1 to the coach wall the beam has been provided at each end with an identical locking or blocking mechanism designed to cooperate with a corresponding locking or blocking mechanism on the adjacent coach wall B on a bracket 15 secured to the wall. The bracket comprises a plate 16 attached to the wall B and has two protruding vertical side plates 17, the outer end portions of which are secured to a horizontal plate 18 extending between them and the upper side of which contacts the lower side of the adjacent end of the beam 1 which thus is resting on the plate 18 in the service position of the beam.

At each end, the beam 1 has a plate 19 on the lower side secured between the legs of the U-form and wherein a bore 20 has been provided on each side for the reception of corresponding tenons 21 extending upwardly from the plate 18 of the bracket 15 and which retain the end of the beam in all directions in the horizontal plane. Plate 18 has secured thereto a vertical locking plate 22 having an opening 22' for engagement with a spring biased blocking element 23 which is displacably carried in a channel formed guide 24 extending in the longitudinal central plane of the beam 1. The outer end surface of the blocking element 23 has an inwardly slanting lower portion for cooperation with a bent upper portion 22" of the locking plate 22 so that the spring biased blocking element during downwardly tilting motion of the end of the beam will be pressed backwards by the portion 22" and automatically guided to blocking engagement in the opening 22' when the end of the beam comes to the rest position against the plate 18.

At each end, the supporting beam 1 is provided with extending arms 25 between which there has been secured a transverse shaft 26 rotatably supporting a sleeve 27 being formed integrally with a strap formed frame 28 serving as a pedal. The sleeve 27 furthermore has an arm 29 which is radially directed and forms an angle with the strap 28. Rotatably attached to the free end thereof is one end of a pulling member, and the other end of which being connected with the blocking element 23 at the opposite end of the supporting beam 1 for blocking or releasing same.

The pulling connection between the arm 29 of the pedal and the respective blocking element 23 may be established in various ways either by means of a flexible member having suitable guides or a rigid connection. An embodiment of the latter type has been shown in the drawings as an example. A rod 31 is attached to the inner end of the blocking element 23 and extends through a vertical arm 33 provided on the plate 19 and has its inner end secured to the end of a rod 30 with a rigid cross connection. The other end of the rod 30 is rotatably attached to the angular arm 29 of the pedal 28. A compression spring 24 is arranged on the rod between the vertical arm 33 and the blocking element 23 on the rod 31 urging the blocking element which is spring biased towards blocking position, whereby its movement is limited by a stopper 35 arranged on the rod 31.

The above described mechanism is functions as follows.

When the sofa in the position shown in FIG. 1 is to be rotated to the opposite direction, the pedal 28 is pivoted by a downward pressure with the foot, causing the rod connection 30, 31, to pull the blocking element 23 out of engagement with the locking plate 22, so that the beam 1 may be tilted around the pivots 8 to the position shown in FIG. 2 through simultaneous release of the retaining tenons 21 on the bracket 15. During the tilting movement, the lower end 4' of the king pin will be pivoted to be released from the fixed, flat tenon 13 on the supporting foot 9 and thus a small initial rotational movement of the beam will bring the peripheral surface of the end 4' of the tenon to contact the side 13' of the fixed tenon 13, preventing return tilting movement. In this position, the beam is rotated with the king pin 4 one half revolution until the groove 12 in the end 4' of the king pin is aligned again with the tenon 13. The other end of the beam which is now in the correct position in relation to the bracket 15, may be pivoted downwardly for engagement with the retaining tenons 21, on the supporting plate 18, simultaneously the blocking element 23 is pressed backwardly by the locking plate 22 against the effect of the spring biased for automatic introduction into the opening 22' in the locking plate as the end of the beam comes to rest against the plate 18.

It will thus be understood that rearrangement of the sofa does not require any power output, but may take place in a speedy, simple and self-adjusting way by means of the cooperation of the king pin with the flat tenon on the bearing bracket. It will further be obvious that in the construction of the centrally arranged bearing bracket or supporting foot is obtained a substantially free space below the sofa, having the above mentioned advantages.

Many modifications and variations of the present invention are possible in light of the above teachings. It is, therefore, to be understood that within the scope of the appended claims, the invention may be practiced otherwise than as particularly described.

I claim:

1. An apparatus for use with seats, such as twin chairs positioned side by side in a railway coach where the said seats are rotatably mounted about a vertical central axis for rearrangement of the seats after a change of driving direction of the railway coach and have means to lock said chairs in a desired position, said apparatus including: a seat support structure located centrally of said seats with vertical and horizontal pivot means for the rotation of the seats as a combined unit thereabout means for tilting said seats about the horizontal axis which axis is transverse to the longitudinal axis of said seats; coupling means at each end of said seats that releasably lock into engagement with corresponding coupling means attached to the adjacent wall of said coach, whereby when the coupling means is released said seats can be pivoted about the horizontal axis and can subsequently be rotated about the vertical axis and when the coupling means is locked said seats are fixedly maintained in an adjusted first working position.

2. An apparatus according to claim 1, wherein: each end of said seats are equipped with a pedal means operable in respect to said coupling means formed at an end of the seats opposite to said pedal means for disengagement of the seats connected to the coupling means on the wall of said coach for tilting said seats by said tilting means to remove the rotation axis from the wall, and rotate said seats in a second working position.

3. An apparatus according to claim 1, including: guide means connected to the seats to cooperate during tilting of said seats with associated fixed complementary guide means for retaining the tilted position of the seats during rotational movement of same from a first working position to another.

4. An apparatus according to claim 1, wherein: said seats comprise a supporting beam extending longitudinally, having a king pin secured thereto being directed vertically downward and rotatably supported in a sleeve with diametrically protruding trunnions whereby the sleeve is supported tiltably about a horizontal transverse axis in a bearing bracket serving as a support foot.

5. An apparatus according to claim 4, wherein: a lower end of the king pin of the beam has a channel formed groove running parallel to the longitudinal direction of the beam, said groove being adapted for receiving a corresponding flat tenon secured to the support foot, the tenon having slanting side surfaces for contact with a peripheral surface of an end of the king pin during rotational movement in a tilted position.

6. An apparatus according to claim 4, wherein: the coupling means attached to the coach wall comprises a bracket having a horizontal plate formed with a portion adapted to serve as a support for an end portion of the supporting beam in a service position of same, said plate portion has vertically upstanding tennons for receiving corresponding bores formed in the underside of the beam end, and a transverse locking plate having an opening for receiving a locking element displaceably and spring biased on the end of the beam.

7. An apparatus according to claim 4, wherein: a supporting beam is provided on said seats, each end of said beam having protruding arms provided with a shaft secured therebetween with one arm on said rotatable sleeve integrally formed with a strap serving as a pedal, a radial arm secured to the sleeve at one end and to the other end of which has been attached one end of a pulling means, the other end of said pulling means being connected with locking means at the opposite end of the supporting beam for drawing back said locking means into a disengaged position from the coupling means on the wall.

* * * * *